(No Model.)
E. J. FRASER.
PROCESS OF AND APPARATUS FOR TREATMENT OF PRECIOUS METALS.
No. 543,546. Patented July 30, 1895.
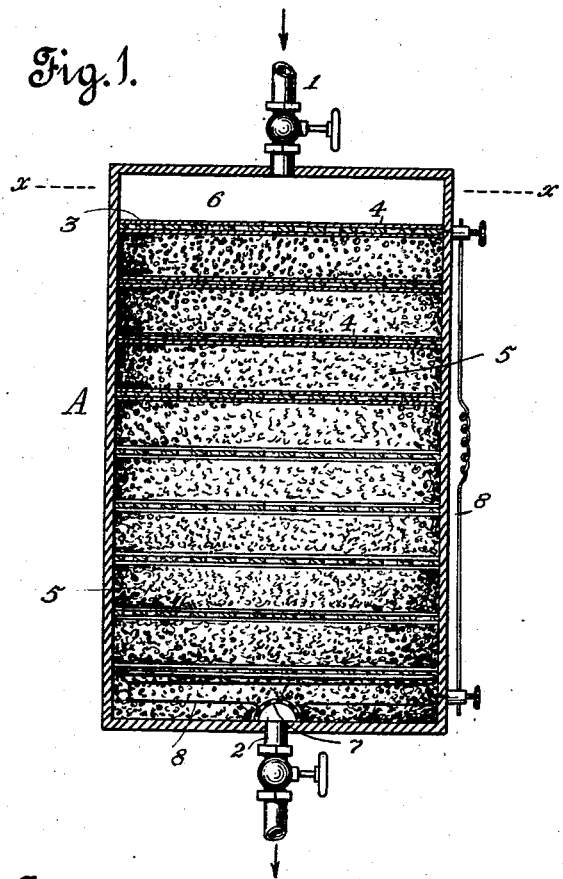
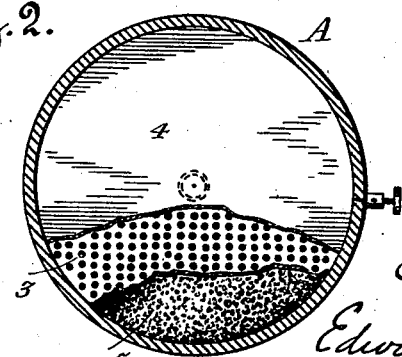
Witnesses.
Inventor.
Edwin J. Fraser
by Spear & Seely
Attorneys

UNITED STATES PATENT OFFICE.

EDWIN J. FRASER, OF SAN FRANCISCO, CALIFORNIA.

PROCESS OF AND APPARATUS FOR TREATMENT OF PRECIOUS METALS.

SPECIFICATION forming part of Letters Patent No. 543,546, dated July 30, 1895.

Application filed November 25, 1893. Serial No. 492,010. (No model.)

*To all whom it may concern:*

Be it known that I, EDWIN J. FRASER, a citizen of the United States, residing at San Francisco, in the county of San Francisco and State of California, have invented certain new and useful Improvements in Processes of and Apparatus for the Treatment of Precious Metals; and I do hereby declare that the following is a full, clear, and exact description thereof.

My invention relates generally to metallurgical processes for separating the precious metals, and more particularly to such processes when employed for separating gold or other precious metal from a solution containing it.

The object of the invention is the recovery of the gold held in solution by co-operating voltaic, chemical, and mechanical means, whereby the mechanical action of the filtering elements is aided and supplemented by the local action of a voltaic pile of battery elements, which themselves form the filter. The action of the filter is thus partly mechanical and partly voltaic and chemical, and the result obtained is a quicker as well as a more complete separation of the gold from the solution.

My invention includes a process for treating the solution in the way above indicated, and also apparatus for carrying out the process, all fully hereinafter described, and shown in the accompanying drawings, in which—

Figure 1 is a vertical section of a filter constructed in accordance with my invention. Fig. 2 is a horizontal section upon the line *x x*.

In describing my process I assume that the gold has been separated from the ore by means of any desired solvent, and is held in a liquid solution ready for subsequent treatment to separate it from the liquid.

I have shown in the drawings an apparatus for carrying out my process, in which A is a vessel of cylindrical or any desired shape, and having closed top and bottom, into which lead inlet and discharge pipes 1 and 2. In the drawings the inlet-pipe is supposed to be at the top and the outlet at the bottom; but this arrangement may be reversed, if desired, and the current caused to flow upward or horizontally. Within this cylinder are placed the alternating elements of a voltaic pile, their number being proportioned to the size and capacity of the tank or vessel. I have shown a series of nine of each element in the drawings. The positive elements shown are plates of zinc 3, perforated with numerous holes, and lined upon both surfaces with sheets 4, of cloth or other suitable porous material. Alternating with the zinc sheets and filling the spaces between them are fillings of carbon 5— such as pulverized charcoal—which form the negative elements. To complete the circuit I usually connect the two ends of the voltaic pile by means of a stout insulated wire 8, placed either inside or, as shown, outside the containing-vessel. I prefer to leave a space 6 at the inlet end in order that the solution, as it is admitted, may be spread and distributed over the surface of the first disk. The solution itself should be slightly acidulated to make it an electrolyte, and thus produce a local voltaic action. The effect of this is to decompose the solution and to precipitate the gold upon the charcoal, which by its mechanical filtering action retains it in the manner of an ordinary filter. At the outlet end of the tank I prefer to place a gauze shield or hood 7, to prevent the charcoal from being washed into the outlet-passage. Now it will be seen that by this construction I use each of the two elements of the pile to accomplish two different results. The zinc acts as a precipitant of the gold and the charcoal as a mechanical filter; but in addition both form voltaic elements, which, in connection with the electrolyte solution, set up a local voltaic action the effect of which is to increase the speed of precipitation by decomposing the solution.

It should be mentioned that a zinc sponge can be employed instead of a plate, in order to give a greater surface or body of zinc.

The gold can be separated from the zinc in various ways, such as by washing or by simply scraping it off, and from the charcoal by subjecting the latter to heat sufficient to consume it.

What I claim is—

1. The process of separating gold or other precious metal held in an electrolytic solution, which consists in passing the solution through a vessel containing alternating porous layers of zinc and carbon, to set up a local voltaic action which tends to decompose the solution, precipitating the gold in the carbon by filtration, substantially as set forth.

2. A voltaic and mechanical filter composed of perforated zinc plates alternating with porous fillings of carbon, adapted to receive an electrolytic solution containing gold, and to separate the gold from the solution by local voltaic action, by precipitation, and by mechanical filtering, substantially as set forth.

In testimony whereof I have affixed my signature, in presence of two witnesses, this 10th day of November, 1893.

EDWIN J. FRASER.

Witnesses:
L. M. SEELY,
WM. F. HALL.